Figure 1:
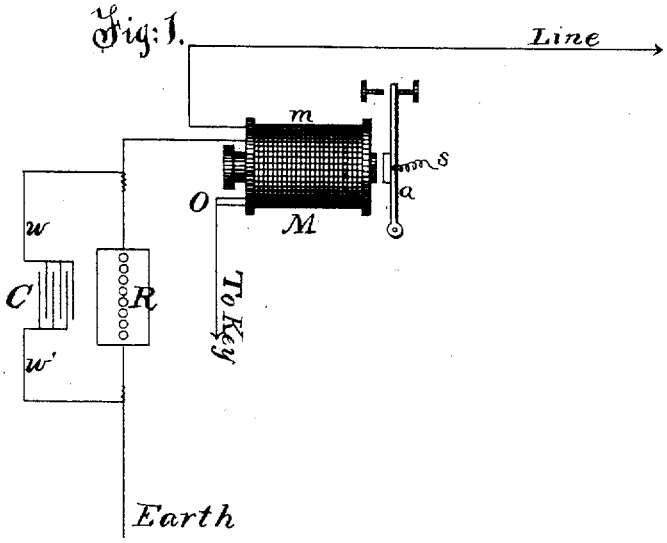

370-27 S4
OR RE 10,035

BEST AVAILABLE COPY

J. B. STEARNS,
Assignor to THE WESTERN UNION TELEGRAPH COMPANY.

DUPLEX TELEGRAPH APPARATUS.

No. 10,035. Reissued Feb. 7, 1882.

Witnesses:

John C. Sanders

Wm Arnoux

Inventor:

Joseph B. Stearns
by his Attorney,
C. L. Buckingham

N. PETERS, Photo-Lithographer, Washington, D. C.

UNITED STATES PATENT OFFICE.

JOSEPH B. STEARNS, OF BOSTON, MASSACHUSETTS, ASSIGNOR TO THE WESTERN UNION TELEGRAPH COMPANY, OF NEW YORK, N. Y.

DUPLEX-TELEGRAPH APPARATUS.

SPECIFICATION forming part of Reissued Letters Patent No. 10,035, dated February 7, 1882.

Original No. 126,847, dated May 14, 1872; Reissue No. 5,344, dated April 1, 1873. Application for reissue filed November 23, 1881.

DIVISION C.

*To all whom it may concern:*

Be it known that I, JOSEPH B. STEARNS, a citizen of the United States, and a resident of Boston, in the county of Suffolk and State of Massachusetts, have invented certain new and useful Improvements in Duplex Telegraphs, of which the following is a specification.

My invention relates to an improvement in the apparatus heretofore employed for transmitting two telegraphic signals simultaneously from opposite ends of one and the same line-wire.

The general object of the invention is to prevent false signals, which have heretofore been produced upon the receiving-instrument at the transmitting or home station by momentary currents due to and effects of static induction upon the main line, commonly called the "charge" and "discharge," though more accurately designated as the "current of static charge" and the "current of static discharge." The charge or current of static charge accompanies the connection of a battery to line to begin a signal, and while the line is being charged an abnormally strong current is set up through the receiving-instrument at the battery end of the line, whose strength rapidly diminishes until the line is fully charged and a current of normal and permanent strength is established throughout its whole length. The discharge or current of static discharge consists of a quick return-current at the battery end of the line, immediately following the transmission of a signal in a direction opposite to that of the current of charge, and occurring after the line has been disconnected from said battery and connected with the earth.

The invention comprises the following subdivision: First, the combination of a main telegraph-line with a branch line having a capacity for storing and discharging electricity, a receiving-instrument, and a key or transmitter for charging and discharging the said main and branch lines simultaneously; second, the combination of a main telegraph-line, a battery, a compensating or artificial line, a rheostat in said artificial line, and a condenser having one of its terminals electrically connected with said artificial line; third, the combination of a battery, a main telegraph-line, a compensating or artificial line, a differential electro-magnet having two coils or helices capable of producing simultaneous, equal, and contrary effects upon its armature, one of said coils being placed in the main and the other in the artificial line, a rheostat in the artificial line, and a condenser having its terminal electrically connected with the artificial line, whereby the static discharges from the main and the artificial lines are made to produce simultaneous but contrary effects upon the armature of the differential electro-magnet.

For the purpose of more clearly explaining my invention, I will first describe the construction and mode of operation of one form of telegraphic apparatus for the simultaneous transmission of signals in opposite directions over the same line, commonly known as a "duplex telegraph," selecting for that purpose the apparatus described in my former patent of June 2, 1868, numbered 78,548. This apparatus is represented, in connection with my present improvements, in Figure 2 of the accompanying drawings.

The conditions requisite for the duplex transmission of signals in opposite directions are, first, the receiving-instrument at each station must remain at all times in connection with the line; second, the signals transmitted by the key at either end of the line must produce no effect upon its associate receiving-instrument, technically termed the "home instrument," at the same station; and, third, the resistance of the line must remain practically constant, irrespective of the position of the transmitting-keys. These several conditions are fulfilled in the apparatus represented in the accompanying drawings, and hereinbefore referred to, as will appear from the following description.

Figure 2:
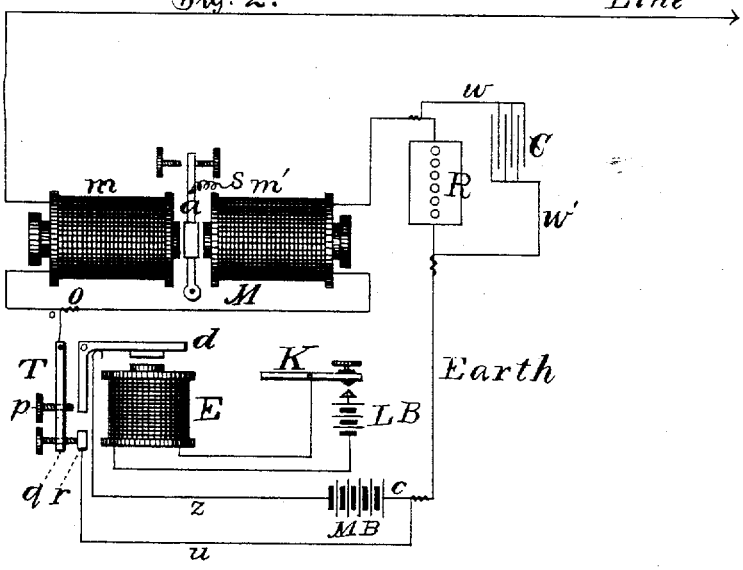

Fig. 2 represents the apparatus at one terminal station of the line, that at the other station being similar thereto in construction and operation.

The receiving-instrument M (here shown as a Morse relay) is constructed in the ordinary manner, and consists of an electro-magnet, *m*, an armature, *a*, and a retractile spring, *s*, to which is added for duplex working an equating electro-magnet, $m'$, so placed as to be capable of exerting an attraction equal to that of the electro-magnet $m$ upon the same armature $a$, but in a contrary direction. Such an arrangement is techically termed a "differential electro-magnet." One terminal of the main battery M B is connected with the earth, and the other to the lever $d$ of the transmitter T, which acts as a key to transmit signals over the main line, as hereinafter explained. When the transmitter is closed the lever $d$ is brought against the stop $p$, making contact with it, and lifting it from the stop $r$, whereupon the current from the battery M B passes by the wire $z$ through the contact-lever $q$ to the point $o$, where it divides, one portion passing through the electro-magnet $m$ of the receiving-instrument to the line, while the other portion passes through the electro-magnet $m'$ of the receiving-instrument and returns directly to the earth, or, what amounts to the same thing, to the other pole, $c$, of the main battery. This latter branch of the circuit, from the point $o$ to the point $c$, is technically termed the "artificial line," in order to distinguish it from the main line, which extends from the point $o$ to the distant station. By inserting a rheostat, R, which has approximately the same resistance as the main line, into the artificial line, as shown in the drawings, the electric current going out from the transmitter will divide at $o$ into two equal portions; and as these produce an equal development of magnetism in the two electro-magnets $m$ and $m'$, the latter will counteract each other in their effect upon the armature $a$, which will therefore remain at rest, notwithstanding that a current is passing over the line to the distant station. If, however, the distant station transmits a current at the same time, the strength of current in the main line is doubled by the combined action of both terminal batteries, and the electro-magnet $m$ overpowers the equating-magnet $m'$, draws the armature $a$ away from it, and produces a signal at the home station. Thus it will be understood that the receiving-instrument at the home station responds only when currents or signals are transmitted from the distant station, and not to those proceeding from its associate key at the home station, and consequently the two stations can transmit signals simultaneously, and the instrument at each station, though always traversed by the current of the main line, responds only to the signals which are transmitted from the other station.

In operating this apparatus it is preferable to make use of a transmitter actuated by an electro-magnet, which is in turn excited by a current from a local battery controlled by an ordinary Morse finger-key, as shown in the drawings, where K is the key; L B, the local battery; E, the electro-magnet which actuates the transmitter-lever $d$, and $r$ is a contact-stop connected to the earth by a wire, $u$. When the key and transmitter are open, the line is connected directly to the earth through the wire $u$.

In Fig. 1 of the drawings I have represented another form of double-transmitting apparatus, also patented by me June 2, 1868, and numbered 78,547, in which the neutralization of the effect of the divided currents is accomplished by providing the relay with two coils wound in opposite directions on the same magnet, as described in the aforesaid patent. In this form of apparatus, also, a rheostat or resistance is used having the same, or nearly the same, resistance as the line.

Having thus described two forms of apparatus to which it may be applied, I will now describe the nature of my improvement and the mode of its application.

It is well known that an insulated telegraphic line-wire of considerable length, whether suspended above the earth or submerged in water, is capable of accumulating or storing up a quantity of electricity while connected with a battery. This property of an insulated conductor is termed its "inductive" or "electrostatic" capacity, and the electricity so retained is called the "static charge" of the conductor. While the line is being charged, an abnormally strong current of momentary duration is set up through the receiving-instrument at the battery end of the line. The strength of this current is at its greatest when the battery is first connected to line, but rapidly diminishes until the line is fully charged and a current of normal strength is established from the battery throughout its whole length. This abnormally strong current momentarily set up through the receiving-instrument I term the "current of static charge." If, therefore, a long line of telegraph, arranged in the manner hereinbefore described, be connected with the battery, by depressing the key at the sending-station, as for the purpose of transmitting a signal, the line will acquire a considerable static charge. At the termination of the signal, when the key is raised, the line is disconnected from the battery and connected to the earth at the home station, whereupon the accumulated electricity stored up in the line will suddenly escape to the earth, traversing the electro-magnet $m$ of the receiving-instrument. Such momentary current I term the "current of static discharge." As the rheostat R and the short line in which it is placed have no perceptible electrostatic capacity, there will be no current of static charge nor current of static discharge through the equating-magnet $m'$, and consequently false signals of momentary duration will be produced by the uncompensated action of the main-line currents of static charge and static discharge in the electro-magnet $m$.

I have discovered that by producing artificial currents of static charge and of static discharge of electricity at the home station, which I also term "effects of static induction," and causing the same to occur simultaneously with the currents of static charge and of static discharge on the line the effect of the latter upon the home instrument can be practically eliminated, provided proper precaution is taken that the artificial currents of static charge and of static discharge shall occur at the same instant of time, but shall be contrary in their effect to those respectively of the main line. This result may be conveniently effected by making use of a device for accumulating or storing up electricity, which is termed a "condenser." I have shown such a condenser in the drawings at C. It consists of two sets of thin metallic plates of considerable surface, separated by insulating-spaces. One set of said condenser-plates is electrically connected to the artificial-line circuit by wire *w* at a point between the electro-magnet M′ and the rheostat R, while the second set is connected to earth.

It is to be observed that the first set of condenser-plates constitutes an insulated terminal, having a large metallic surface, of a branch wire connected to the artificial line. The amount of inductive charge which said plates will receive will of course depend upon the aggregate area of the sheets, the strength of current passing over the artificial line, the resistance of the artificial line between its junction with wire *w* and the earth, and the inductive reaction between said plates and the second set, which is connected to earth. If such resistance be low, very little current will be forced upon the insulated terminal plates, while if high the condenser-plates will receive a charge of high tension. It is therefore apparent that by connecting one set of inductive plates to the artificial line, when in close proximity to a second set connected to earth, such artificial line at such point of connection is virtually given a large artificial inductive capacity. My artificial line and condenser therefore constitute an artificial line having a largely increased metallic surface, and in close proximity thereto, but insulated therefrom, a metallic conducting-surface electrically connected with the earth.

I do not limit myself to the use of a condenser with the particular form of duplex apparatus shown, as the apparatus hereinbefore described may be employed with equally good results in connection with other forms of apparatus.

What I claim as my invention is—

1. The combination, in a duplex telegraph substantially as hereinbefore set forth, of a receiving-instrument responsive to signals from a distant station only, a main telegraph-line, a branch or compensating line, and means for giving said branch an artificial capacity for storing electricity, and a key or transmitter for charging and discharging the main and branch lines simultaneously.

2. The combination, in a duplex telegraph substantially as hereinbefore set forth, of a battery, a main line, an artificial or compensating line, a rheostat in said artificial line, and a condenser having its terminals respectively connected with said artificial line and the earth.

3. The combination, substantially as hereinbefore set forth, of a battery, a main line, an artificial or compensating line, a differential electro-magnet having two coils capable of producing simultaneous, equal, and contrary effects upon its armature, one of said coils being in the main and the other in the artificial line, and a condenser having one of its terminals electrically connected with the artificial line and the other with the earth.

Signed by me this 4th day of August, A. D. 1881.

J. B. STEARNS.

Witnesses:
CHAS. T. CARRET,
HENRY BALDWIN, Jr.